Aug. 19, 1941.        T. C. DELAVAL-CROW        2,253,327
LUBRICATING METHOD
Filed April 20, 1938

INVENTOR:
THOMAS C. DELAVAL-CROW,
BY
HIS ATTORNEY.

Patented Aug. 19, 1941

2,253,327

UNITED STATES PATENT OFFICE 2,253,327

LUBRICATING METHOD

Thomas C. Delaval-Crow, Bristol, Conn., assignor to General Motors Corporation, Detroit, Mich., a corporation of Delaware Application April 20, 1938, Serial No. 203,126

2 Claims. (Cl. 184—1)

This invention relates to bearings and lubricating methods therefor, and has particular application to bearings for tape tension pulleys as used in textile machinery.

An object is to provide a permanently lubricated, sealed, antifriction bearing for a tape tension pulley. Another object is to provide an antifriction bearing which contains a non-fluid lubricant and which has a fluid lubricant feed for maintaining the non-fluid lubricant in soft, lubricating condition. A further object is to provide an improved lubricating method for bearings.

To these ends and also to improve generally upon devices of the character indicated, the invention consists in the various matters hereinafter described and claimed.

Figure 1:
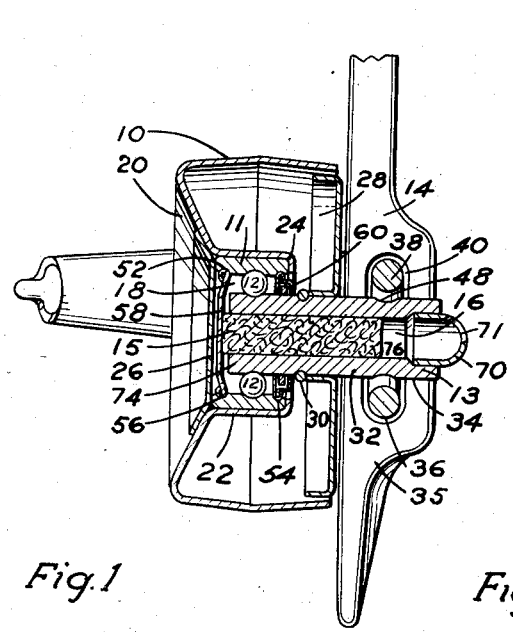
Figure 1 is a parti-sectional view taken substantially along the line 1—1 of Figure 2 and showing a tape tension pulley and its mounting embodying one form of the invention.

Generally stated, in each of the illustrated embodiments a pulley, such as the tape tension pulley 10, is mounted on the outer race ring 11 of a sealed ball bearing 12 which contains a substantially non-fluid lubricant, such as a non-fluid grease, the bearing being provided with an elongated inner race ring, as 13, removably fastened to a supporting bracket, as 14, which is mounted for adjustable movement in any well known manner to position the pulley, and a wick 15, mounted in a bore, as 16, in the inner race ring, is arranged to slowly feed small amounts of a fluid lubricant, such as oil, to the sealed lubricant chamber 18 in the bearing so that the non-fluid lubricant in the chamber 18 will not dry out and harden, but will always remain sufficiently soft to correctly lubricate the bearing and to prevent overheating of the bearing.

Figure 2:
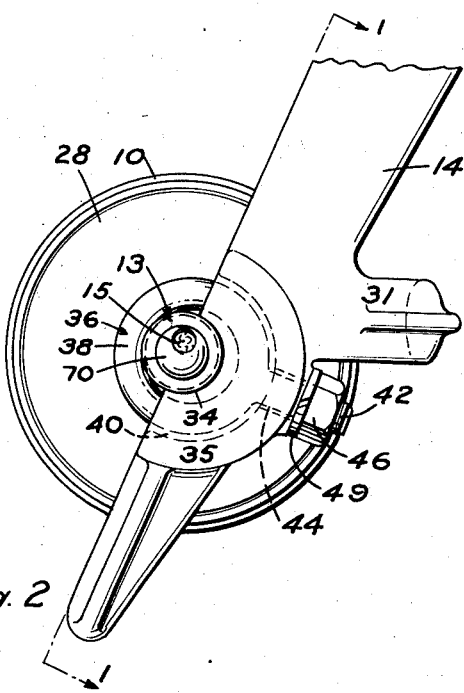
Figure 2 is an end elevation of the structure shown in Figure 1.

Referring to the embodiment shown in Figures 1 and 2, a light, rigid pulley 10, preferably pressed to shape from sheet metal, has a closed side provided with an inwardly tapering wall 20 from which laterally extends an internal hub 22 mounted on the outer race ring 11 which is held between the end hub flange 24 and a capplate 26 fastened to the wall 20 as by welding. A pressed metal, annular dust guard 28, mounted on the inner race ring 13 and axially positioned by the bracket 14 and by a snap-ring 30 mounted in a peripheral race ring groove, substantially closes the open side of the pulley and prevents the accumulation of lint and other foreign materials within the pulley.

The outer end 32 of the race ring 13 is removably mounted in a grooved seat 34 extending across one side of the enlarged bracket portion 35, and an eye bolt 36 is provided with an eye 38 which surrounds the seated end 32 for movement in an arcuate recess 40 that opens into an intermediate portion of the seat 34, the threaded end 42 of the eye bolt extending through a bore 44 in the bracket portion 35 and being provided at its outer end with a nut 46. The hole through the eye 38 is sufficiently large to loosely receive the outer end 32 of the inner race ring 13, and when the nut 46 is tightened the eye 38 is shifted into clamping engagement with a peripheral race ring groove 48 to removably clamp the race ring 13 in the seat 34 and to demountably support the pulley and bearing assembly in unit-handling relation on the bracket 14. A lock washer 49 on the eyebolt resists the tendency of the nut 46 to loosen.

The ends of the outer race ring 11 have the internally disposed peripheral grooves 52 and 54 which respectively and sealingly receive the curled over peripheral edge 56 of a circular end plate 58, and the seal 60, such as that shown in my United States Patent number 2,054,580, issued on September 15, 1936. A closure member 70, such as a pressed metal oil cup provided with a filling aperture 71, is fitted into the outer end of the bore 16 which extends longitudinally through the inner race ring 13, and the inner end 74 of the race ring 13 is spaced slightly from the end plate 58. Fluid lubricant fed through the aperture 71 into the supply chamber 76, formed by the outer end of the bore 16 and the closure member 70, will slowly permeate the wick 15, which preferably fills the inner end of the bore 16 and extends beyond the inner end 74 of the race ring 13 into wiping contact with the rotatable end plate 58, and will enter the chamber 18 to mix with the non-fluid lubricant to prevent this non-fluid lubricant from drying out and hardening and to maintain the consistency of this non-fluid lubricant in the required, soft, lubricating condition for correctly lubricating and cooling the bearing 12. The wiping action of the wick 15 against the plate 58 aids the distribution of the fluid lubricant, and the feeding aperture 71 in the member 70 is preferably located at such a height above the bottom of the supply chamber 76 as to permit only a small amount of fluid lubricant in the chamber 76 at one time and to prevent feeding too much fluid lubricant into the bearing chamber 18.

Figure 3:
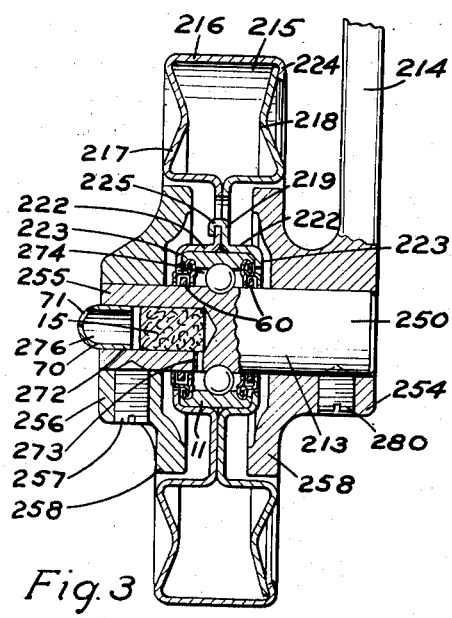
Figure 3 is a view of the general character of Figure 1 and showing another embodiment.

In the embodiment illustrated by Figure 3 a two part pressed metal pulley 215, provided with a belt engaging flange 216, has opposed annular side walls 217 and 218 bent towards each other into abutting engagement intermediate their peripheries and then towards the pulley axis to provide a substantially radially disposed annular web 219, the inner ends of these walls being bent laterally away from each other to form a central hub 222 which contains the outer race ring 11 held in the hub by the bent over end flanges 223. The two parts of the pulley are generally similar in form except that one side of the flange 216 is bent over to form the side wall 217, while the other side of the flange 216 is peripherally curled back at 224 into overlying engagement with the wall 218, the web portions of these walls being fastened together by struck-up portions 225 bent back through holes in the adjacent wall and into clamped engagement with the latter.

The bearing of Figure 3 is generally similar to the bearing shown in my Figure 1, but the seals 60 are mounted at both ends of the outer race ring 11 and the inner race ring 213 projects from both ends of the bearing, one end 250 being demountably fastened by a set screw 280 in an enlarged portion 254 of the bracket 214, and the other end 255 of the inner race ring 213 supporting a guard 256 removably held in position by a set screw 257. The bracket 214 is suitably supported in any well known manner for adjustably positioning the pulley 215, and like the guard 256 has a dust guard flange 258 extending into the pulley at one side of the web 219 to prevent the entrance of lint and other foreign materials into the pulley. A closure member 70, such as a pressed metal oil cup, is fitted into the outer end of the bore 272, which partially extends through the inner race ring 213, and a transverse passage 273 in the race ring 213 connects this bore 272 with the bearing chamber 274 which contains a non-fluid lubricant, the wick 15 being preferably located at the inner end of the bore 272 to control the flow of a fluid lubricant from the supply chamber 276 to the bearing chamber 274 for maintaining the non-fluid lubricant in a correct lubricating condition within the bearing.

I claim:

1. The method of lubricating which consists in employing a non-fluid lubricant, and supplying a solvent fluid lubricant thereto; substantially as described.

2. The method of lubricating which consists in providing a non-fluid grease, and intermittently and slowly feeding small quantities of a solvent fluid oil lubricant thereto to maintain said grease in a soft lubricating condition; substantially as described.

THOMAS C. DELAVAL-CROW.